(12) United States Patent
Chomicki et al.

(10) Patent No.: US 12,737,427 B2
(45) Date of Patent: Sep. 15, 2026

(54) MULTI-SECTION SUPPORT IN GRAPHICAL APPLICATION BUILDER

(71) Applicant: Palantir Technologies Inc., Denver, CO (US)

(72) Inventors: Joshua Chomicki, Carnation, WA (US); Rajdeep Singh Dosanjh, Coventry (GB); Stephanie Yu, New York, NY (US); Till Kern, Munich (DE); Walker Burgin, Seattle, WA (US)

( * ) Notice: Subject to any disclaimer, the term of this patent is extended or adjusted under 35 U.S.C. 154(b) by 224 days.

(21) Appl. No.: 18/478,457

(22) Filed: Sep. 29, 2023

(65) Prior Publication Data

US 2025/0060947 A1 Feb. 20, 2025

Related U.S. Application Data

(60) Provisional application No. 63/520,036, filed on Aug. 16, 2023.

(51) Int. Cl.

| | |
|---|---|
| ***G06F 8/34*** | (2018.01) |
| ***G06F 3/0486*** | (2013.01) |
| ***G06F 16/957*** | (2019.01) |
| *G05B 19/042* | (2006.01) |
| *H04L 9/32* | (2006.01) |
| *H04L 67/564* | (2022.01) |

(52) U.S. Cl.

CPC .......... *G06F 16/957* (2019.01); *G06F 3/0486* (2013.01); *G06F 8/34* (2013.01); *G05B 19/042* (2013.01); *H04L 9/3236* (2013.01); *H04L 67/564* (2022.05)

(58) Field of Classification Search

CPC ... H04L 67/564; H04L 9/3236; G05B 19/042; G06F 3/0486; G06F 16/957

See application file for complete search history.

(56) References Cited

U.S. PATENT DOCUMENTS

| | | | | |
|---|---|---|---|---|
| 7,349,761 | B1 * | 3/2008 | Cruse | G05B 19/042 709/230 |
| 10,803,140 | B1 * | 10/2020 | Morris | G06F 16/957 |
| 2012/0124372 | A1 * | 5/2012 | Dilley | H04L 67/564 713/162 |
| 2017/0090734 | A1 * | 3/2017 | Fitzpatrick | G06F 3/0486 |
| 2018/0205554 | A1 * | 7/2018 | Blinn | H04L 9/3236 |

OTHER PUBLICATIONS

Xiong Peng, CN 104077387(translation), Mar. 22, 2018, 19 pgs <CN_104077387.pdf>.*

Ma et al., CN 106095979 (translation) Nov. 9, 2016, 15 pgs <CN_106095979.pdf>.*

(Continued)

*Primary Examiner* — Tuan A Vu

(57) ABSTRACT

A system for managing a web application is disclosed. The system is programmed to enable graphically building a web application having one webpage with multiple views, where a view can have multiple sections and can contain a section from another view. The web application includes a hierarchical structure of nodes respectfully for generating the multiple views. Each node can be accessed separately and each node can reference certain other nodes.

20 Claims, 6 Drawing Sheets

(56) References Cited

OTHER PUBLICATIONS

Zheng et al., CN 110413861, (translation), Oct. 22, 2021, 23 pgs <CN_110413861.pdf>.*
Tao Tao, CN 104731824, (translation) Dec. 18, 2018, 11 pgs<CN_104731824.pdf>.*
"Feature Overview V6.21.2." V6.14.2 | React Router, http://reactrouter.com/en/main/start/overview. Accessed Jul. 24, 2023, 22 pages.

* cited by examiner

FIG. 2A
200
206
http://www.example-website.com/
203
GRACEFUL
Search
208
Your Store: (open 10:00 AM-9:00 PM)
Newport Centre Jersey City
0 items
202
Back to School
Piercing
Trending
Jewelry
Hair
Beauty
Bags
Accessories
Tech
Home
Celebrations
Gifts
Clearance
Buy More,
Have More!
Buy 2 items, get 10% Off
Buy 3 items, get 15% Off
EAR PIERCING
NOSE PIERCING
EAR PIERCING KITS
FAQS
BOOK NOW
SIGN UP
204

MULTI-SECTION SUPPORT IN GRAPHICAL APPLICATION BUILDER

BENEFIT CLAIM

This application claims priority benefit under 35 U.S.C. § 119 (e) to U.S. Provisional Application No. 63/520,036 titled "MULTI-SECTION SUPPORT IN GRAPHICAL APPLICATION BUILDER" and filed Aug. 16, 2023, the entire contents of which are hereby incorporated by reference for all purposes as if fully set forth herein.

TECHNICAL FIELD

The present disclosure relates to web application development, and more particularly to graphical application builders and single-page applications.

BACKGROUND

Today, there exist graphical tools for building a web application having multiple webpages. Such a graphical tool allows a user to specify the rendering of the webpages via a graphical user interface (GUI). For example, graphical commands can be used to specify a widget (e.g., button) to be included in a webpage and the corresponding action to be performed upon interaction with the widget. The graphical tool then translates the graphical commands into code segments in specific programming languages or related data. At runtime, a web server serves these webpages to a web client, which then renders these webpages. Each of these webpages is associated with its web address and typically has a single section for an entire screen. When a user chooses to navigate to another web address, the web client would load another webpage, thus refreshing the entire screen.

Instead of a single section, allowing multiple sections corresponding to multiple web addresses within a webpage can improve the appearance and function of the webpage presented to the user. Therefore, it would be helpful for a graphical application builder to support the efficient rendering of multiple sections within a webpage.

SUMMARY

The appended claims may serve as a summary of the invention

BRIEF DESCRIPTION OF THE DRAWINGS

Example embodiments will now be described by way of non-limiting example with reference to the accompanying drawings, in which.

DETAILED DESCRIPTION OF CERTAIN EMBODIMENTS

Figure 1:
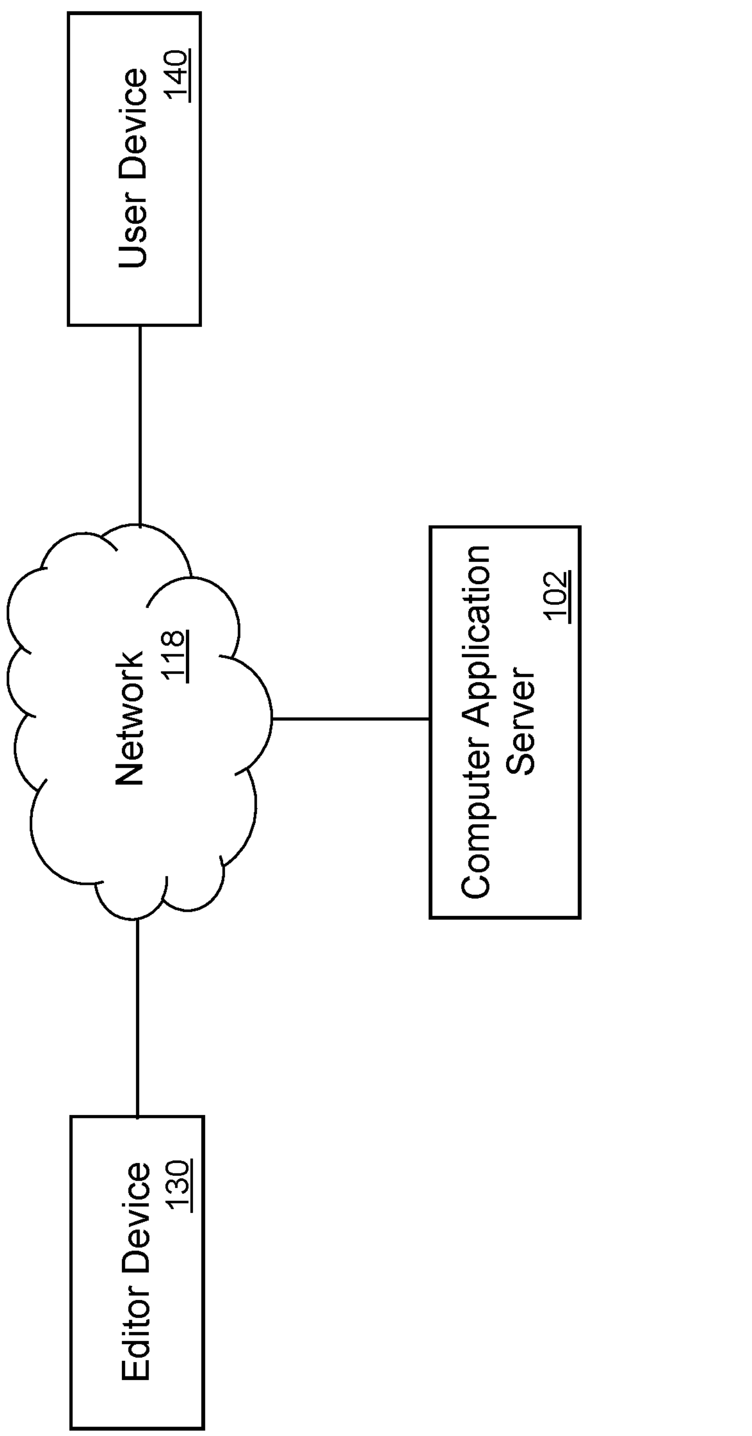
FIG. 1 illustrates an example networked computer system in which various embodiments may be practiced.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1. General Overview

A system for managing a web application is disclosed. The system is programmed to enable graphically building a web application having one webpage with multiple views, where a view can have multiple sections and can contain a section from another view. The web application includes a hierarchical structure of nodes respectfully for generating the multiple views. Each node can be accessed separately and each node can reference certain other nodes.

In some embodiments, an editor device is programmed to run a builder client that allows an editor to graphically build a web application, including a single-page application having one webpage that is dynamically rewritten with new data from a web server. Graphical commands can be issued to form a view and each section within the view. For example, a menu option in the builder client could be chosen to add a new section to a view, the graphical representation of the new section can be moved to specify the position of the new section, and the graphical representation of an existing section can be clicked on to add a reference to that existing section to the view. For each section, graphical commands can be issued to form a widget or assign an action to a widget. For example, an icon in the builder client can be drag-and-dropped to include a button in the section.

In some embodiments, additional commands can be issued to associate each view with a web address, leading to at least one hierarchy of web addresses, where the hierarchical relationship can be reflected in the web addresses or separately specified. As each view is built, the builder client translates the graphical commands into code segments or related data for generating the view. The code segments can be implemented in various programming languages used for developing a web application. The builder client then adds a node having the code segments and related data to a hierarchical structure corresponding to one of the at least one hierarchy of web addresses that is saved as part of the web application. The builder may maintain various configurations related to the hierarchies of web addresses and corresponding hierarchical structures of nodes for the web application, in terms of a total number, width, depth, branching factor, total size, or other aspects. In general, each node is allowed to access only its ancestor nodes on the path to the root node. For the webpage that is also saved as part of the web application, the builder client adds control logic for accessing the hierarchical structure. The web application is ultimate stored on a web server.

In some embodiments, a user device is programmed to run a web client that allows a user (an end user) to run the web application. As the user navigates to any web address of the web application, the web client initially sends a request to the web server for a webpage and receives the webpage of the web application. As the user navigates to additional web addresses of the web application, the web client performs client routing and sends requests for specific nodes of the web application that have not yet been requested, and generates corresponding views including rendering the sections therein. The web client can request one node each time for the specific web address being visited.

The system disclosed herein has several technical benefits. The system enables efficient building and execution of web applications. The graphical user interface allows expedient development of various views of a single-page application. By maintaining a hierarchical structure where each node has access to its ancestor nodes, reusing development effort is possible and encouraged. The single-page nature and client-side routing reduce the amount of data needed from a web server and thus the latency in responding to a request to visit a web address. The capability of lazy loading also reduces the delay in communicating with the web server. The single-page nature and client-side routing additional improve webpage rendering with less refresh. The hierarchical structure also permits increased certainty and accuracy in application state management.

2. Example Computing Environments

FIG. 1 is shown in simplified, schematic format for purposes of illustrating a clear example and other embodiments may include more, fewer, or different elements.

In some embodiments, the networked computer system comprises a computer application server ("server") 102, an editor device 130, and a user device 140, which are communicatively coupled through direct physical connections or via a network 118.

In some embodiments, the editor device 130 hosts and executes various computer applications, such as a standalone graphical application builder for building a web application or a client of a graphical application builder. The editor device 130 can be configured to communicate with the server 102 in automatically performing activities involving communication with remote computer applications. The editor device 130 can comprise a desktop computer, laptop computer, tablet computer, smartphone, or wearable device.

In some embodiments, the server 102 hosts and executes various computer applications, such as a builder server of a graphical application builder that receives and responds to requests from a corresponding builder client, an application that manages and delivers a graphical application builder, or a web server that receives and responds to requests from a corresponding web client. The server 102 can comprise any computing facility with sufficient computing power in data processing, data storage, and network communication for performing the above-mentioned functions.

In some embodiments, the user device 140 hosts and executes various computer applications, such as a web browser, within which a web application can be running. The user device 140 can be configured to communicate with the server 102 in automatically performing activities involving communication with remote computer applications. The user device 140 can comprise a desktop computer, laptop computer, tablet computer, smartphone, or wearable device.

The network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), or the Internet, a terrestrial or satellite link.

In some embodiments, the server 102 is programmed to receive one or more requests to develop a web application from the editor device 130. The server 102 can be programmed to respond to these requests as it runs a builder server of a graphical application builder. The sever 102 can be further programmed to store the web application as it is being developed. Subsequently, the server 102 is programmed to receive one or more requests to access a webpage of the web application or associated resources from the user device 140. The server 102 can be programmed to respond to these requests as it runs a web server.

3. Functional Descriptions

In some embodiments, the server 102, the editor device 130, and the user device 140 can each be programmed to perform specific functions, as discussed in various embodiments herein. These functions can be implemented as software components, general or special-purpose hardware components, firmware components, or any combination thereof.

Figure 2A:
FIG. 2A illustrates an example screen of a web application associated with a root web address.
Figure 2B:
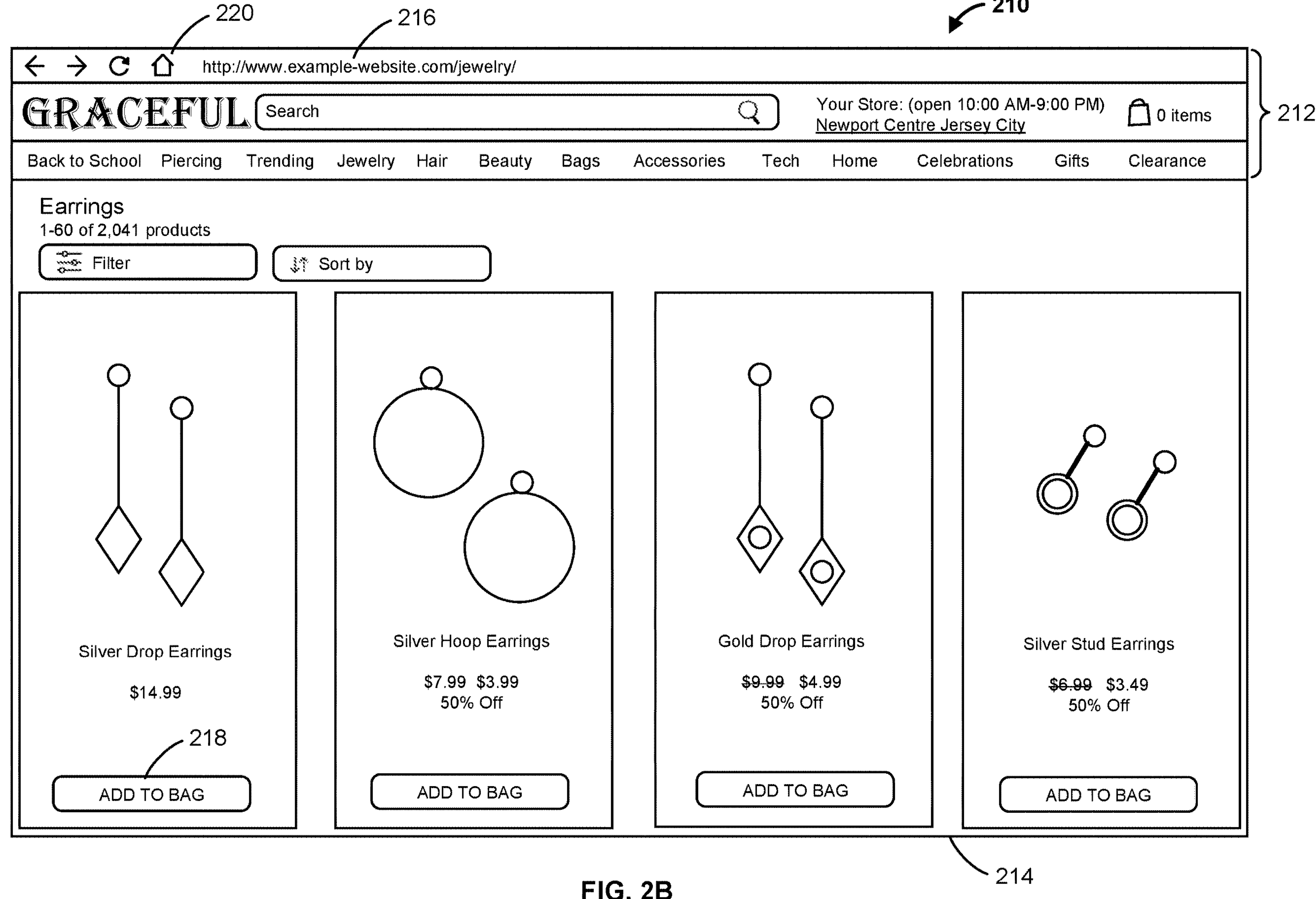
FIG. 2B illustrates an example screen of the web application associated with a web address under the root web address.
Figure 3:
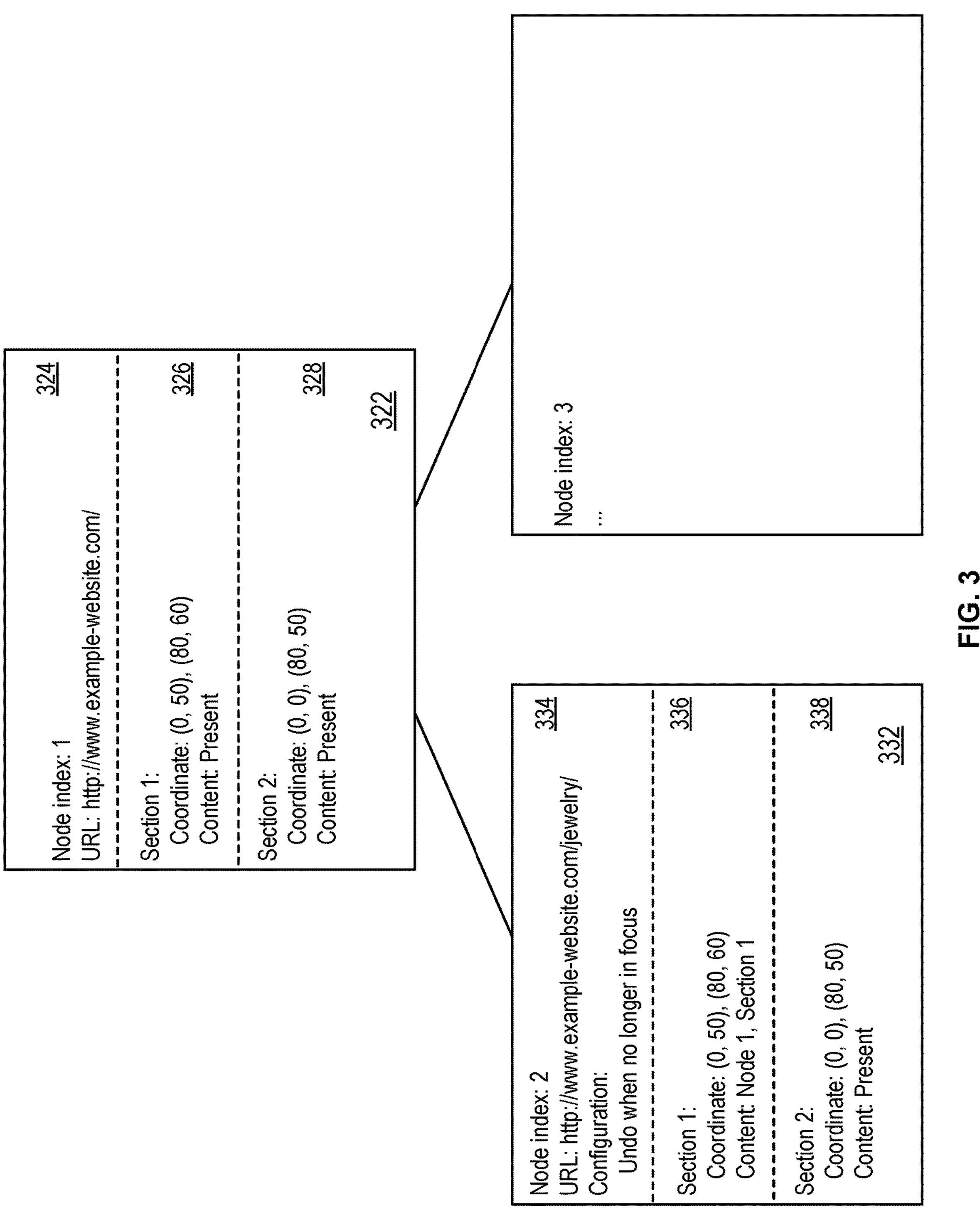
FIG. 3 illustrates an example hierarchical structure for rendering the webpage for different web addresses.

FIG. 2A illustrates an example screen of a web application associated with a root web address. FIG. 2B illustrates an example screen of the web application associated with a web address under the root web address. FIG. 3 illustrates an example hierarchical structure for rendering the webpage for different web addresses.

3.1. Application Building

In the embodiments discussed herein, a web application is associated with a set of web addresses or uniform resource locators (URLs) to which a user can navigate. The set of web addresses typically forms a hierarchy in that the web addresses corresponding to a lower portion of the hierarchy are extensions of the web addresses corresponding to a higher portion of the hierarchy. For example, the root of the hierarchy can correspond to the URL 206 in FIG. 2A, while a child of the root can correspond to the URL 216 in FIG. 2B, which is an extension of the URL 206 by adding a slug to the end. As a single-page application (SPA), the web application is associated with a single webpage rendered for one screen, and each web address is associated with a "view" for the webpage having one or more "sections", such as the view 200 having the section 202 and the section 204 in FIG. 2A or the view 210 having the section 212 and the section 214 in FIG. 2B. Different sections could be associated with different originating web addresses. For example, the section 212 is presently associated with the URL 216 but is originally associated with the URL 206.

In some embodiments, the server 102 through executing a builder server of a graphical application builder is programmed to provide a GUI as a builder client of the graphical application builder to the editor device 130. The builder client allows a user to graphically build a web application with graphical commands, including an SPA with client-side routing. The graphical commands correspond to graphical (visual) representations instead of textual (narrative) representations. Examples include clicking on an icon, drag-and-dropping a line image, or choosing a menu item. The editor device 130 is programmed to receive the builder client and present the GUI. The server 102 is further programmed to build and store a hierarchical structure for generating views of the web application based on user input. Using the GUI, a user of the editor device 130 could develop individual views associated with a hierarchy of web addresses. For each view, the user can graphically specify a layout, including the position and size of each section. The user could also graphically specify various settings, such as how to maintain or release a view, which amounts to loading or unloading a node. For each section, the user could graphically specify the content to be included, which can be or refer to the content already specified for another view.

In some embodiments, in response to user input to develop each view, the server 102 is programmed to translate the graphical commands provided by the user to code segments or related data for generating the view. The code segments can be implemented in Hypertext Markup Language (HTML), Cascading Style Sheets (CSS), JavaScript, React, Hypertext Processor (PHP), or other relevant programming languages. The server 102 is programmed to add a node to the hierarchical structure that represents the view, incorporating the code segments and related data for generating the view. Due to the automatic translation, the code segments or the related data follow a specific format as distinguished from code segments or libraries manually composed by a user. For example, the code segments can have specific modules corresponding to specific types of widgets or references to other sections, and each module follows specific syntactic or semantic rules depending on the type of widget or reference. Each node functions as a container object, which has access to all the ancestor nodes on the path up to the root. Each node can have one or more attributes or any appropriate internal structure. Each node can include one or more references to sections of the ancestor nodes, thereby creating a dependency to the referenced nodes.

In one example, as the user builds the view 200 for the URL 206, the user could provide information for the sections 202 and 204. In response, the server 102 is programmed to add the node 322 to the hierarchical structure. The node 322 includes a set of attributes 324 regarding the view 200, a set of attributes 326 regarding a first section 202, and a set of attributes 328 regarding a second section 204. For the set of attributes 324, the configuration attribute indicates specific settings, such as releasing the view when it is no longer the present view (the view is no longer in focus). For the set of attributes 326, the position attribute indicates the position of the section 202 via the coordinates of two of the four corners. The content attribute points to a collection of data and instructions for rendering the section 202 that is initially associated with the URL 206. The content of the section 202 includes a menu bar having the item 208 as an option and an icon 203 for a shopping bag. For the set of attributes 328, the position attribute indicates the position of the section 204 via the coordinates of two of the four corners; the content attribute points to a collection of data and instructions for rendering the section 204 that is initially associated with the present view 200 for the URL 206.

In the example, as the user then builds the view 210 for the URL 216, the user could provide information for the sections 212 and 214. In response, the server 102 is programmed to add the node 332 to the hierarchical structure. The node 332 includes a set of attributes 334 regarding the view 210, a set of attributes 336 regarding a first section 212, and a set of attributes 338 regarding a second section 214. For the set of attributes 336, the content attribute points to a collection of data and instructions for generating the section 212, which comes from the section 202 that is initially associated with the URL 206 (Node 1, Section 1). For the set of attributes 338, the content attribute points to a collection of data and instructions for rendering the section 214 that is initially associated with the URL 216. The content for section 214 includes a button 218 to add an item to the shopping bag represented by the icon 203, which is incorporated into the section 212.

In some embodiments, the user can attempt to update the hierarchy of web addresses or the hierarchical structure. For example, a user request may be received to move a node associated with the URL ending with "/jewelry/overview/" to the URL ending with "/jewelry/products/" or the URL ending with "/overview/". In response, the server 102 is programmed to validate such an attempted move, including verifying the accessibility of any nodes referenced by the node to be moved. In general, only the ancestor nodes are accessible; when the node is moved to a position where a referenced node is no longer an ancestor node, which can be in an entirely different hierarchical structure, the server 102 is programmed to report a problem and/or send a notification to the editor device 130 that the attempted move would fail.

In some embodiments, the hierarchical relationships among the web addresses are not derived from the web addresses themselves but are specified separately. In this case, the URL specified in the node 332 would not be an extension of the URL specified in the node 322, for example.

In some embodiments, the server 102 is programmed to manage versioning of the nodes to allow the use of multiple versions. As a user request is received to save a new version of a node of the hierarchical structure, the server 102 is programmed to update only data related to that node without affecting the data related to the other nodes.

In some embodiments, the server 102 is programmed to generate control logic to be included in the webpage of the web application for accessing the hierarchical structure in generating the views. The control logic can be implemented using Asynchronous JavaScript and XML (AJAX), for example. The control logic can perform client-side routing that maps different web addresses to corresponding views using data in the hierarchical structure. The control logic can also perform lazy loading by requesting only the nodes necessary to generate the present view from the server 102 and only generating the present view based on the requested nodes. Overall, the control logic can determine a web address from a web client request, identify a corresponding node in the hierarchical structure, and generate a view of the web application based on the node. In certain embodiments, in addition to the control logic, a default node, such as the one associated with the root URL, is included in the webpage without needing to be explicitly requested.

In some embodiments, when the web client requests correspond to a series of web addresses from the root down, the control logic can request the corresponding nodes of the hierarchical structure in order from the server 102. When the initial web client request corresponds to a web address lower in the hierarchy, however, the control logic can first access the node corresponding to the initial web client request. When the node refers to an ancestor node, the control logic can then access the ancestor node. As such, the control logic can generate the initial view for the initial web client request based on all the accessed nodes. When a subsequent web client request corresponds to the ancestor node, the control logic can readily generate the subsequent view for the subsequent web client request based on the ancestor node. The control logic can also unload the node by releasing the associated resources, unless specific configurations specify otherwise.

3.2. Application Execution

In some embodiments, a web server application run by the server 102 receives a web client request from the user device 140 that specifies any of the web addresses of the web application. In response to the web client request, the web server sends a webpage containing the control logic to the user device 140. The control logic can encode a mapping between the hierarchical structure and the hierarchy of web addresses. For example, the control logic can include a copy of the sets of attributes for the nodes, such as the sets of attributes 324 and 334, so that it can request the sets of attributes for the corresponding sections as appropriate.

In some embodiments, a web client receives the webpage in response to the web client request. As discussed above, when executed, the control logic can determine a web address from the web client request, identify the corresponding node in the hierarchical structure, request the node from the server 102 as necessary, and generate a corresponding view for the webpage of the web application. The process can repeat as a user of the user device 140 visits different web addresses of the web application.

In some embodiments, each node can be requested from the server 102 on demand to effect lazy loading. Alternatively, all the nodes can be requested at once, or each node could be requested at appropriate times depending on the workload of the user device 140. Each node can be loaded into a local memory. As discussed above, the generation of each view could be performed based on the corresponding node. The node essentially holds state information regarding the view. Each view as an instantiation of the node continuously listens for relevant events and renders the corresponding sections as appropriate.

In one example, a first web client request indicating the URL 206 is received by the user device 140 and submitted to the web server. In response, a webpage is received from the web server, including the control logic. By executing the control logic, the URL 206 is determined, the node 322 associated with the URL 206 is identified based on set of attributes 324 and requested from the web server, and the corresponding view 200 having the sections 202 and 204 is rendered in the webpage (and thus loaded into the browser) based on the received sets of attributes 326 and 328.

In the example, subsequently, a second web client request indicating the URL 216 is received by the user device 140, based on a user selecting the menu items 208 or directly typing the URL 216 in the address bar of the browser, for example. By executing the control logic, the URL 216 is determined, the node 332 associated with the URL 216 is identified based on set of attributes 334 and requested from the web server, and the corresponding view 210 having the sections 212 and 214 is generated in the webpage based on the received sets of attributes 336 and 338. In this case, according to the content attribute in the set of attributes 336, the section 212 reuses the section 202. Since the section 202 is already rendered, it does not need to be rendered again, and thus the section 202 can remain displayed as the section 212 without a refresh. The section 214 can be rendered in place of the section 204.

In the example, subsequently, a user command is received by the user device 140 based on a user pressing the button 218 in the section 214. This user command causes an update to the cart that is part of the section 212 and thus part of the section 202 given that the node 332 has access to the node 322.

In the example, subsequently, a third web client request indicating an URL equal to the URL 206 is received by the user device 140 based on a user clicking on the button 220 or typing the URL in the address bar, for example. By executing the control logic, the URL 206 is determined, the node 322 associated with the URL 206 is identified based on set of attributes 324, and the corresponding view 200 having the sections 202 and 204 is generated in the webpage based on the sets of attributes 326 and 328. In this case, the node 332 was requested from the web server previously and does not need to be requested again. The node 322 is still loaded, and the section 202 is still active and can remain displayed without a refresh. The section 204 can be re-rendered in place of the section 214. The node 332 no longer needs to function as a container object and is to be unloaded from the local memory to release associated resources to the configuration attribute in the collection of attributes 328.

In some embodiments, a web client request can be received indicating an invalid web address that is not associated with any node in the hierarchical structure. The control logic can detect the invalid web address based on hierarchical structure and perform an automatic redirect to a system- or user-specified URL with a system- or user-specified message in response to the web client request.

4. Example Processes

Figure 4:
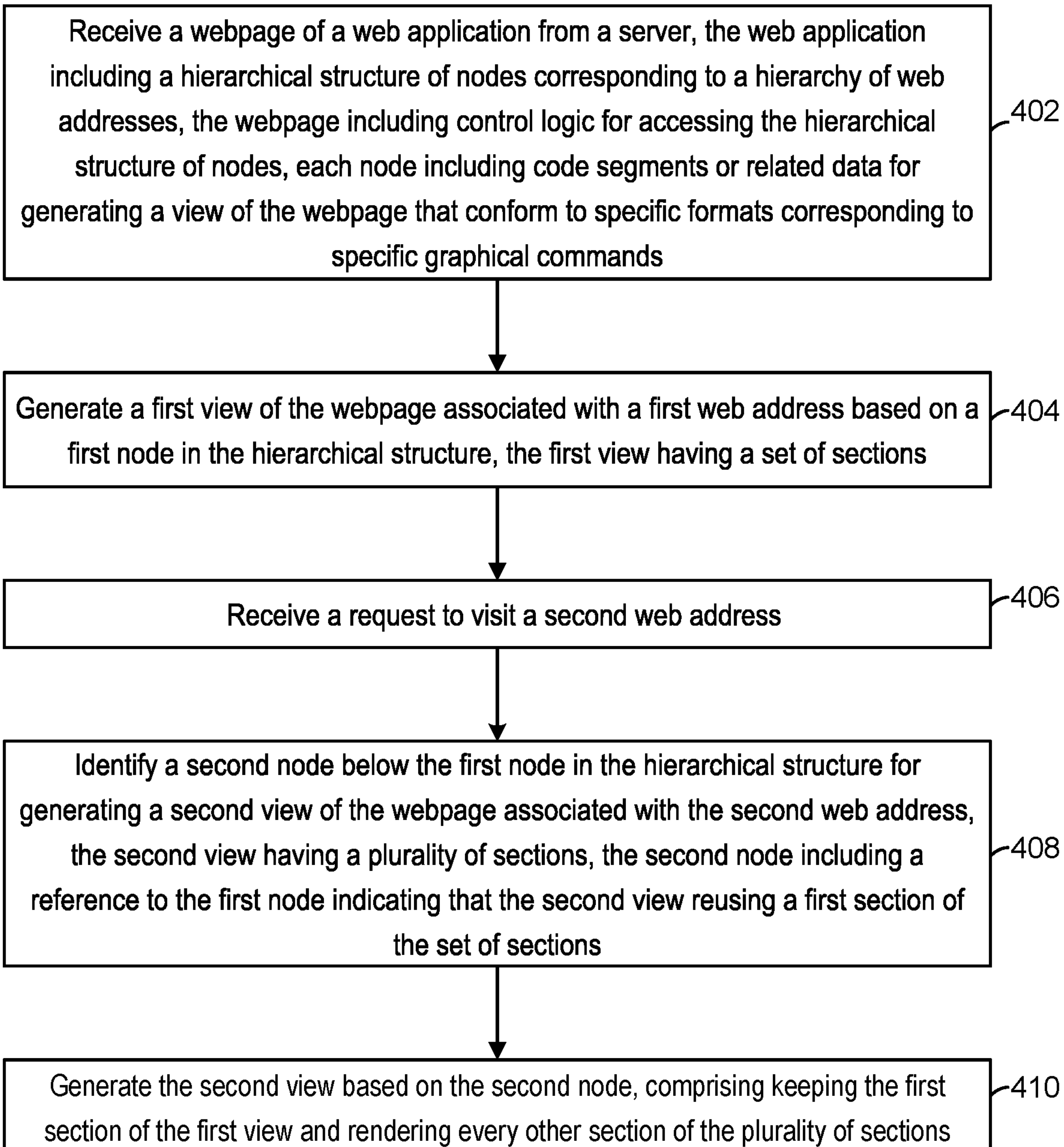
FIG. 4 illustrates an example process performed by a computer application server in accordance with disclosed embodiments.

FIG. 4 illustrates an example process of managing a web application performed by a user device in accordance with some embodiments described herein. FIG. 4 is shown in simplified, schematic format for purposes of illustrating a clear example and other embodiments may include more, fewer, or different elements connected in various manners. FIG. 4 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In other embodiments, the user device is programmed to receive a certain request to visit a first web address and send a specific request to a web server for a webpage.

In some embodiments, in step 402, the user device is programmed to receive a webpage of a web application from a server. The web application includes a hierarchical structure of nodes corresponding to a hierarchy of web addresses, the webpage includes control logic for accessing the hierarchical structure of nodes, and each node includes code segments or related data for generating a view of the webpage that conform to specific formats corresponding to specific graphical commands.

In certain embodiments, a node in the hierarchical structure includes a configuration indicating when to unload the node or load additional nodes. In other embodiments, the graphical commands are translatable to code segments or related data for forming a widget or associating an action with the widget. In yet other embodiments, the graphical commands are translatable to code segments or related data for forming a view of the webpage having multiple sections out of a plurality of views.

In certain embodiments, the user device is programmed to identify a first node associated with a first web address, request the first node from the server, receive the first node from the server; and load the received first node into a local memory.

In step 404, the user device is programmed to generate the first view of the webpage associated with the first web address based on the first node in the hierarchical structure, where the first view has a set of sections.

In step 406, the user device is programmed to receive a request to visit a second web address.

In certain embodiments, the second web address is lower in the hierarchy of web addresses than the first web address and being an extension of the first web address.

In step 408, the user device is programmed to identify a second node below the first node in the hierarchical structure for generating a second view of the webpage associated with the second web address. The second view having a plurality of sections, and the second node includes a reference to the first node indicating that the second view reusing a first section of the set of sections.

In certain embodiments, the user device is programmed to, in response to the identifying, request the second node from the server, receive the second node from the server, and load the received second node into a local memory.

In step 410, the user device is programmed to generate the second view based on the second node, comprising keeping the first section of the first view and rendering every other section of the plurality of sections.

In certain embodiments, the user device is programmed to, after generating the second view, receive a second request to visit the first web address and generate the first view, comprising keeping the first section of the first view and rendering every other section of the set of sections. In other embodiments, the user device is programmed to, after generating the second view, receive a second request to visit the first web address, and unload the received second node from the local memory.

In certain embodiments, the user device is programmed to receive a certain request to visit a third web address, which is lower than a root of the hierarchy of web addresses. The user device is further programmed to request a third node corresponding to the third web address from the server and receive the third node from the server, where the third node includes a specific reference to a fourth node. In addition, the user device is programmed to request the fourth node from the server.

In certain embodiments, the user device is programmed to receive a specific request to visit a specific web address and determine that the specific web address is invalid based on the hierarchical structure. The user device is further programmed to identify a third web address based on the specific request, determine a third node in the hierarchical structure for generating a third view of the webpage associated with the third web address, and generate the third view based on the third node.

Additional example processes are recited as follows:

A non-transitory, computer-readable storage medium storing one or more sequences of instructions which when executed cause one or more processors to perform:

- receiving, via a graphical user interface, a plurality of graphical commands for building a web application,
- the plurality of graphical commands indicating associating a hierarchy of web addresses respectively with a plurality of views for the webpage, one view of the plurality of views having multiple sections;
- creating a hierarchical structure of nodes respectively for the plurality of views based on the plurality of graphical commands,
- one node for the one view including code segments for rendering the multiple sections,
- the one node including a reference to an ancestor node on a path from the one node to a root of the hierarchical structure for rendering a section of the plurality of sections;
- generating the web application including control logic for accessing the hierarchical structure.

The non-transitory, computer-readable storage medium of claim 1, the one or more sequences of instructions when executed causing the one or more processors to further perform:

- receiving input data to move a specific web address of the hierarchy of web address;
- verifying that the move is permissible based on a specific node for a specific view associated with the specific web address.

The non-transitory, computer-readable storage medium of claim 1, the one or more sequences of instructions when executed causing the one or more processors to further perform:

- receiving input data to update a view of the plurality of views;
- storing a new version of the view in local memory.

5. Example Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
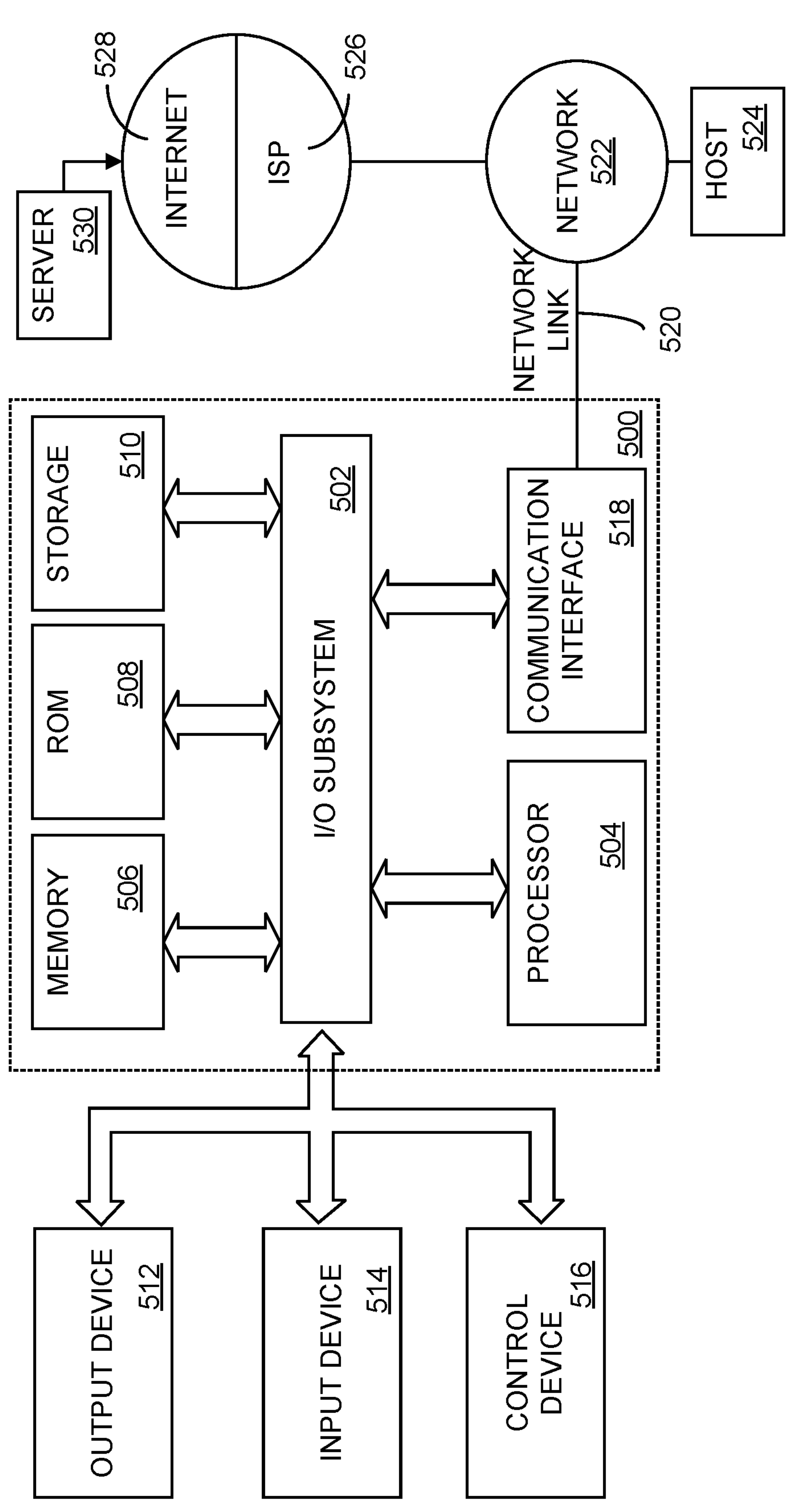
FIG. 5 illustrates a computer system upon which various embodiments may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk, or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement Transmission Control Protocol/Internet Protocol (TCP/IP), Hypertext Transfer Protocol (HTTP) or other communication protocols; file processing instructions to interpret and render files coded using HTML, Extensible Markup Language (XML), Joint Photographic Experts Group (JPEG), Moving Picture Experts Group (MPEG) or Portable Network Graphics (PNG); user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators, or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on the output device 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware, and interfaces for generating position reporting packets, notifications, pulse or heartbeat signals, or other recurring data transmissions that specify a position of the computer system 500, alone or in combination with other application-specific data, directed toward host computer 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to I/O subsystem 502. Communication interface 518 provides a two-way data communication coupling to network link(s) 520 that are directly or indirectly connected to at least one communication network, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a LAN, WAN, campus network, internetwork, or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server 530 may be coupled to internet 528. Server 530 broadly represents any computer, data center, virtual machine, or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, URL strings with parameters in HTTP payloads, application programming interface (API) calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or NoSQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

The invention claimed is:

1. A non-transitory, computer-readable storage medium storing one or more sequences of instructions which when executed cause one or more processors to perform:

receiving a webpage of a web application from a server, the web application including a hierarchical structure of nodes corresponding to a hierarchy of web addresses, the webpage including control logic for accessing the hierarchical structure of nodes, each node including code segments or related data for generating a view of the webpage that conform to specific formats corresponding to specific graphical commands;

generating a first view of the webpage associated with a first web address based on a first node in the hierarchical structure, the first view having a set of sections;

receiving a request to visit a second web address;

identifying a second node below the first node in the hierarchical structure for generating a second view of the webpage associated with the second web address, the second view having a plurality of sections;

the second node including a reference to the first node indicating that the second view reuses a first section of the set of sections;

generating the second view based on the second node, wherein the first section of the first view is already rendered and wherein generating the second view comprises keeping, based on the reference to the first node included in the second node, the first section of the first view such that it remains displayed and rendering every other section of the plurality of sections.

2. The non-transitory, computer-readable storage medium of claim 1, the one or more sequences of instructions when executed causing the one or more processors to further perform:

in response to the identifying, requesting the second node from the server;

receiving the second node from the server;

loading the received second node into a local memory.

3. The non-transitory, computer-readable storage medium of claim 2, the one or more sequences of instructions when executed causing the one or more processors to further perform:

after generating the second view, receiving a second request to visit the first web address;

unloading the received second node from the local memory.

4. The non-transitory, computer-readable storage medium of claim 1, the one or more sequences of instructions when executed causing the one or more processors to further perform:

after generating the second view, receiving a second request to visit the first web address;

generating the first view, comprising keeping the first section of the first view and rendering every other section of the set of sections.

5. The non-transitory, computer-readable storage medium of claim 1, a node in the hierarchical structure including a configuration indicating when to unload the node or load additional nodes.

6. The non-transitory, computer-readable storage medium of claim 1, the graphical commands being translatable to code segments or related data for forming a widget or associating an action with the widget.

7. The non-transitory, computer-readable storage medium of claim 1, the graphical commands being translatable to code segments or related data for forming a view of the webpage having multiple sections out of a plurality of views.

8. The non-transitory, computer-readable storage medium of claim 1, the second web address being lower in the hierarchy of web addresses than the first web address and being an extension of the first web address.

9. The non-transitory, computer-readable storage medium of claim 1, identifying the first node associated with the first web address;

requesting the first node from the server;

receiving the first node from the server;

loading the received first node into a local memory.

10. The non-transitory, computer-readable storage medium of claim 1, the one or more sequences of instructions when executed causing the one or more processors to further perform receiving a certain request to visit the first web address, the webpage being received in response to the certain request.

11. The non-transitory, computer-readable storage medium of claim 1, the one or more sequences of instructions when executed causing the one or more processors to further perform:

receiving a certain request to visit a third web address, which is lower than a root of the hierarchy of web addresses;

requesting a third node corresponding to the third web address from the server;

receiving the third node from the server, the third node including a specific reference to a fourth node;

requesting the fourth node from the server.

12. The non-transitory, computer-readable storage medium of claim 1, the one or more sequences of instructions when executed causing the one or more processors to further perform:

receiving a specific request to visit a specific web address;

determining that the specific web address is invalid based on the hierarchical structure;

identifying a third web address based on the specific request;

determining a third node in the hierarchical structure for generating a third view of the webpage associated with the third web address;

generating the third view based on the third node.

13. A method of managing a computer application, comprising:

receiving a webpage of a web application from a server, the web application including a hierarchical structure of nodes corresponding to a hierarchy of web addresses, the webpage including control logic for accessing the hierarchical structure of nodes, each node including code segments or related data for generating a view of the webpage that conform to specific formats corresponding to specific graphical commands;

generating a first view of the webpage associated with a first web address based on a first node in the hierarchical structure, the first view having a set of sections;

receiving a request to visit a second web address;

identifying a second node below the first node in the hierarchical structure for generating a second view of the webpage associated with the second web address, the second view having a plurality of sections;

the second node including a reference to the first node indicating that the second view reuses a first section of the set of sections;

generating the second view based on the second node, wherein the first section of the first view is already rendered and wherein generating the second view comprises keeping, based on the reference to the first node included in the second node, the first section of the first view such that it remains displayed and rendering every other section of the plurality of sections.

14. The method of claim 13, further comprising:

in response to the identifying, requesting the second node from the server;

receiving the second node from the server;

loading the received second node into a local memory.

15. The method of claim 14, further comprising:

after generating the second view, receiving a second request to visit the first web address;

unloading the received second node from the local memory.

16. The method of claim 13, further comprising:

after generating the second view, receiving a second request to visit the first web address;

generating the first view, comprising keeping the first section of the first view and rendering every other section of the set of sections.

17. A system for managing a computer application, comprising:

one or more processors; and a computer-readable storage medium storing one or more sequences of instructions which, when executed cause the one or more processors to perform the following processes:

receiving a webpage of a web application from a server, the web application including a hierarchical structure of nodes corresponding to a hierarchy of web addresses, the webpage including control logic for accessing the hierarchical structure of nodes, each node including code segments or related data for generating a view of the webpage that conform to specific formats corresponding to specific graphical commands;

generating a first view of the webpage associated with a first web address based on a first node in the hierarchical structure, the first view having a set of sections;

receiving a request to visit a second web address;

identifying a second node below the first node in the hierarchical structure for generating a second view of the webpage associated with the second web address, the second view having a plurality of sections;

the second node including a reference to the first node indicating that the second view reuses a first section of the set of sections;

generating the second view based on the second node, wherein the first section of the first view is already rendered and wherein generating the second view comprises keeping, based on the reference to the first node included in the second node, the first section of the first view such that it remains displayed and rendering every other section of the plurality of sections.

18. The system of claim 17, wherein the processes performed by the processors further comprise:

in response to the identifying, requesting the second node from the server;

receiving the second node from the server;

loading the received second node into a local memory.

19. The system of claim 18, wherein the processes performed by the processors further comprise:

after generating the second view, receiving a second request to visit the first web address;

unloading the received second node from the local memory.

20. The system of claim 17, wherein the processes performed by the processors further comprise:

after generating the second view, receiving a second request to visit the first web address;

generating the first view, comprising keeping the first section of the first view and rendering every other section of the set of sections.

* * * * *